US009083761B1

United States Patent
Belshe

(10) Patent No.: US 9,083,761 B1
(45) Date of Patent: Jul. 14, 2015

(54) REDUCED LATENCY FOR SUBRESOURCE TRANSFER

(75) Inventor: Mike Belshe, Saratoga, CA (US)

(73) Assignee: Google Inc., Mountain View, CA (US)

(*) Notice: Subject to any disclaimer, the term of this patent is extended or adjusted under 35 U.S.C. 154(b) by 132 days.

(21) Appl. No.: 13/293,000

(22) Filed: Nov. 9, 2011

Related U.S. Application Data

(60) Provisional application No. 61/412,266, filed on Nov. 10, 2010.

(51) Int. Cl.
*G06F 15/16* (2006.01)
*H04L 29/08* (2006.01)
*G06F 15/167* (2006.01)
*G06F 12/08* (2006.01)
*G06F 17/30* (2006.01)

(52) U.S. Cl.
CPC .......... *H04L 67/2847* (2013.01); *G06F 15/167* (2013.01); *G06F 12/0862* (2013.01); *G06F 17/30902* (2013.01); *H04L 67/02* (2013.01); *H04L 67/2814* (2013.01); *H04L 67/2828* (2013.01)

(58) Field of Classification Search
CPC . H04L 67/2847; H04L 67/02; H04L 67/2814; H04L 67/2828; G06F 17/30902; G06F 12/0862; G06F 15/167
USPC ......................................... 709/217, 219, 203
See application file for complete search history.

(56) References Cited

U.S. PATENT DOCUMENTS

| 7,779,068 B2* | 8/2010 | Li et al. ......................... 709/203 |
| 8,321,533 B2* | 11/2012 | Fainberg et al. .............. 709/219 |
| 2005/0198309 A1* | 9/2005 | Li et al. ......................... 709/227 |
| 2009/0063622 A1* | 3/2009 | Cheng et al. .................. 709/203 |
| 2011/0029641 A1* | 2/2011 | Fainberg et al. .............. 709/219 |

OTHER PUBLICATIONS

Oettinger, Jacob: "Improved User Perceived Performance Through Client-State Aware Gateway," Kongens Lyngby—Sep. 2008.

* cited by examiner

*Primary Examiner* — Kyung H Shin
(74) *Attorney, Agent, or Firm* — Sterne, Kessler, Goldstein & Fox P.L.L.C.

(57) ABSTRACT

Methods and systems for reducing web page load time are provided. A method for reducing web page load time may include determining subresources of a requested web page. The method may also include requesting the plurality of subresources in a packet. This may be a single request packet for all of the subresources of a web page. Another method for reducing web page load time may include determining subresources to be returned from a request packet. The method may also include generating and returning the subresources in response to the request packet. A system for reducing web page load time may include a subresource determiner and a subresource requester. Another system for reducing web page load time may include a subresource request determiner, a subresource generator and a subresource returner.

10 Claims, 5 Drawing Sheets

REDUCED LATENCY FOR SUBRESOURCE TRANSFER

CROSS REFERENCE TO RELATED APPLICATIONS

This application claims the benefit of U.S. Provisional Appl. No. 61/412,266, filed Nov. 10, 2010, which is hereby incorporated by reference in its entirety.

BACKGROUND

1. Technical Field

The field relates to network protocols and the World Wide Web.

2. Background

Web browsers are software applications that allow a user to view or download content that is available on a network, such as on a website on the World Wide Web. Content may include text, files, images, audio, video and personal communications. Web pages present such content and are located using uniform resource identifiers (URI) such as a uniform resource locator (URL). Web pages may be retrieved using the Internet Protocol (IP) address of the computer holding the web page content.

Browsers may use a number of protocols and standards to obtain or manage content flow. Most browsers primarily use hypertext transfer protocol (HTTP) to fetch content and web pages. HTTP is an application level protocol providing basic request/response semantics. For example, as shown in FIG. 1, HTTP Requester 110 may send a request, such as for a web page, over network 120. HTTP Responder 130 may receive the HTTP request and return an HTTP response, such as content for the requested web page.

Web pages today usually require multiple subresources, such as images, scripts, video, links, news or other web page content. These subresources are often retrieved from other server domains. Unfortunately, HTTP makes separate requests for each of these subresources. These multiple request/response roundtrips contribute to an accumulated latency that can cause discomfort to users of a web browser.

BRIEF SUMMARY

Embodiments described herein refer to systems and methods for reducing web page load time. According to an embodiment, a method for reducing web page load time may include determining a plurality of subresources of a requested web page. The method may also include requesting the plurality of subresources in a packet. This may be a single request packet for all of the subresources of a web page.

According to a further embodiment, a method for reducing web page load time may include determining a plurality of subresources to be returned from a request packet. The method may also include generating the plurality of subresources. The method may further include returning the plurality of subresources in response to the request packet.

According to another embodiment, a system for reducing web page load time may include a subresource determiner configured to determine a plurality of subresources of a requested web page. The system may also include a subresource requester configured to request the plurality subresources in a packet.

According to a further embodiment, a system for reducing web page load time may include a subresource request determiner configured to determine a plurality of subresources to be returned from a request packet. The system may also include a subresource generator configured to generate the plurality of subresources. The system may further include a subresource returner configured to return the plurality of subresources in response to the request packet.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

HTTP is the application level protocol providing basic request/response semantics. Transmission Control Protocol (TCP) is a generic, reliable transport protocol, providing guaranteed delivery, duplicate suppression, in-order delivery, flow control, congestion avoidance and other transport features. When network traffic is required, User Datagram Protocol (UDP) packets are sent to another computer and eventually a UDP response is provided. Unfortunately, HTTP over TCP was not particularly designed with consideration of latency effects.

Web pages today usually require multiple subresources, such as images, scripts, video, links, news or other web page content. Unfortunately, HTTP makes separate requests for each of these subresources. For example, two separate requests are made as a web page parser discovers the need to obtain subresources for a web page. As shown below there are two separate requests: one for "foo.js" and a later request for "foo.jpg".

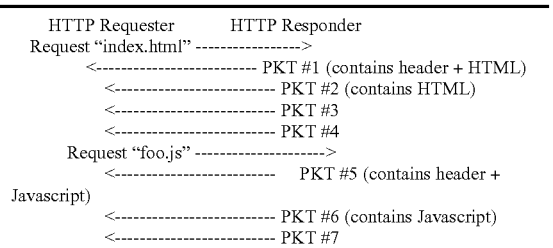

```
        Request "foo.jpg" -------------------->
              <------------------------- PKT #8 (contains header + jpg
    data)
              <------------------------- PKT #9 (contains jpg data)
```

These multiple request/response roundtrips, multiplied by a large number of subresources, contribute to an accumulated latency that can cause discomfort to users of a web browser.

The embodiments described herein provide for reducing web page load time by requesting the subresources for a web page at an earlier time, perhaps all at once. The goal of requesting multiple sub-resources at the same time is to reduce user-perceived latency when navigating the Internet. In some cases, subresources may also be fetched using subresource uniform resource identifiers (URIs), which are characters used to identify a name or resource on the Internet. Subresources may also be fetched using uniform resource locators (URLs) such as domains, hostnames, hostnames plus paths or other sources of content.

Figure 1:
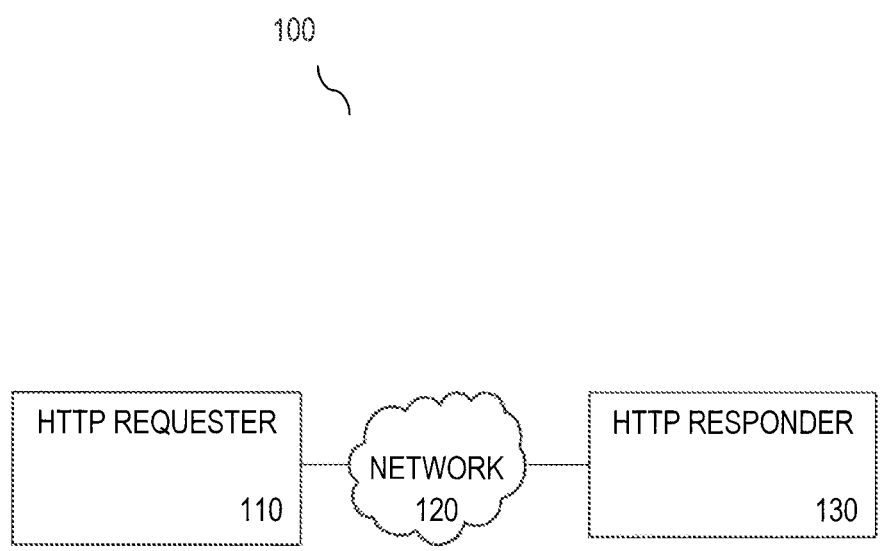
FIG. 1 shows an example Internet communication network which relates to embodiments.
Figure 2:
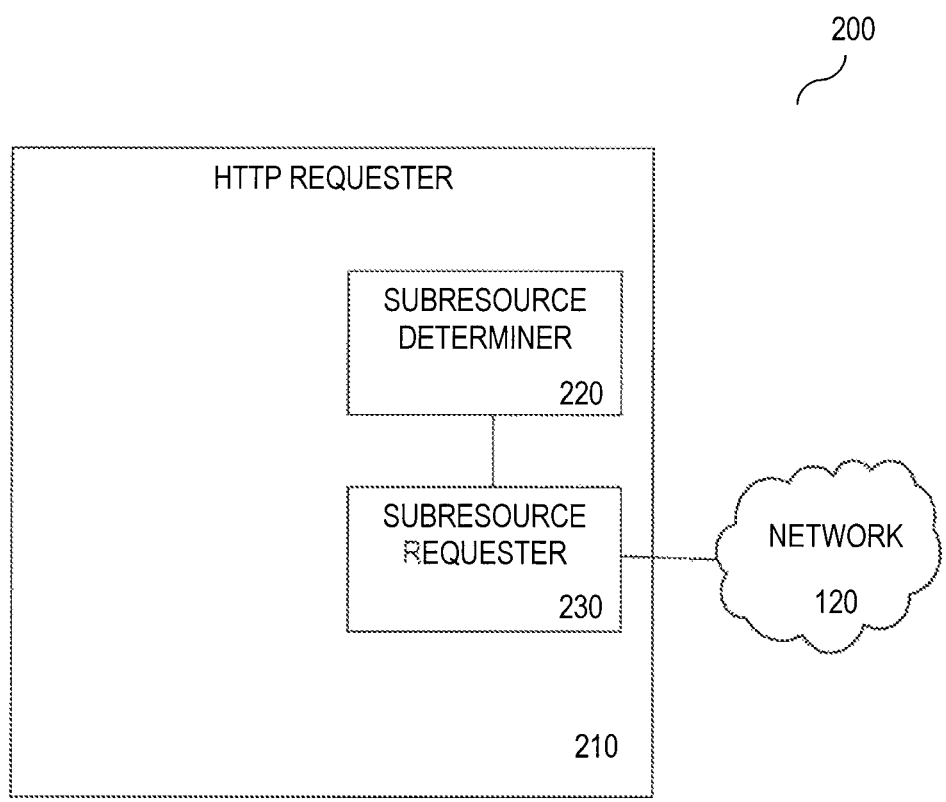
FIG. 2 illustrates an architecture diagram of a system for reducing web page load time according to an embodiment.

FIG. 2 is an architecture diagram of exemplary system 200 for reducing web page load time, according to an embodiment. System 200 includes HTTP requester 210. HTTP requester 210 may be an HTTP web client or web server established on a local device. A local device may be a computing device. Examples of computing devices include, but are not limited to, a computer, workstation, distributed computing system, computer cluster, embedded system, stand-alone electronic device, networked device, mobile device (e.g. mobile phone, smart phone or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and graphical user interface display.

According to an embodiment, HTTP requester 210 may be configured to provide the functionality of a web client, which is a software component that makes an HTTP request to an HTTP responder, such as an HTTP server. A web server may contain web applications which generate content in response to an HTTP request. A web server may package the generated content and serve the content to a client in the form of an HTTP response. HTTP requester 210 may transmit HTTP requests and receive HTTP responses over network 120.

According to an embodiment, HTTP requester 210 may include subresource determiner 220 and subresource requester 230. Subresource determiner 220 may be configured to determine multiple subresources of a web page that must be obtained and loaded, according to an embodiment. These subresources must be requested.

In some embodiments, subresource determiner 220 may determine subresources for a web page from metadata of the web page. Metadata may include subresource types, values, URIs or other identifying information. This subresource information may be used to form a request for all of the subresources at once or early on. In some embodiments, a subresource header field of the HTTP requester and/or the HTTP responder may need to be enabled. Server content may be enabled by web content developers who are seeking to improve the delivery of their web content and the experience of web page visitors. An HTTP requester or client may receive a response with a subresource header. It may decode the value and generate requests for the URIs listed in the header. In other embodiments, subresource determiner 220 may parse a web page in order to collect subresource types and sources.

Subresource determiner 220 may be coupled to subresource requester 230. Subresource requester 230 may be configured to request multiple subresources at one time. This may be performed with a single request. This may also involve multiple requests are messages in a single packet.

```
    HTTP Requester         HTTP Responder
    Request "index.html" ------------------>
              <------------------------- PKT #1 (contains header + subresource
    data + HTML)
    Request "foo.js" --------------------->
    Request "foo.jpg" -------------------->
              <------------------------- PKT #2 (contains HTML)
              <------------------------- PKT #3
              <------------------------- PKT #4
              <------------------------- PKT #5 (contains header + Javascript)
              <------------------------- PKT #8 (contains header + jpg data)
              <------------------------- PKT #9 (contains jpg data)
              <------------------------- PKT #6 (contains Javascript)
              <------------------------- PKT #7
```

As shown above the requests for "foojs" and "foo.jpg" are made together. By requesting subresources earlier on, the subresources may be returned and loaded in parallel with other aspects of the web page. This parallel process may reduce the number of round trips and thus reduce latency. In some cases, if more subresources are needed than can fit into the first packet, follow on packets, each with multiple resources, may be sent for the other subresources.

According to an embodiment, subresource requester 230 may request multiple subresources in the next request packet. This may be the request packet immediately subsequent to the initial request for the web page or index of the web page. The request for the subresources may be made in a single packet. The request for the subresources of the web page may be made, and possibly returned, before any other requests for subresources or web page content.

Subresource requester 230 may load requests for the plurality of subresources into an HTTP request header that is then transmitted over network 120 to the HTTP responder, according to an embodiment. The request for subresources may be performed at the beginning of the loading of the requested web page. It may be the first task upon arriving at a web page. Subresource content may be received at the same time as the rest of the page is being rendered. In another embodiment, the subresources may be expected to be returned according to an order listed in the subresource request packet. In some cases, subresource requests may be made in the content of a request packet. Subresources may also be prefetched using a reference tag or reference link.

Figure 3:
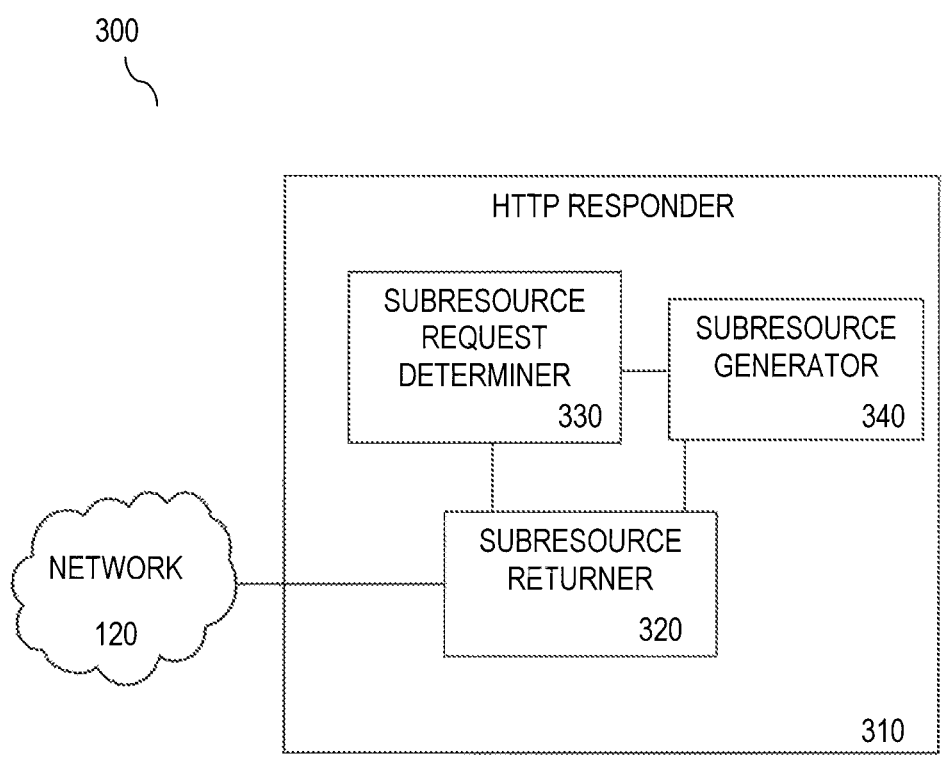
FIG. 3 illustrates an architecture diagram of another system for reducing web page load time according to an embodiment.

FIG. 3 is an architecture diagram of exemplary system 300 for reducing web page load time, according to an embodiment. System 300 includes HTTP responder 310. HTTP responder 310 may be an HTTP web client or web server established on a local device.

According to an embodiment, HTTP responder 310 may include subresource request determiner 330, subresource generator 340 and subresource returner 320. According to a further embodiment, subresource returner 320 may be configured to receive HTTP headers over network 120. This may be the result of establishing an HTTP request-response pair between HTTP requester 210 and HTTP responder 310 corresponding to one or more web page requests.

According to an embodiment, subresource returner 320 may be configured to determine HTTP header information according to packets or requests received in association with a web page request or HTTP request. Subresource request determiner 330 may determine subresources that are requested and that should be returned to the requesting client or server. These may be obtained from a request header that is formed according to an understood format. In another embodiment, the request packet may indicate that it is enabled to request the subresources at once. The HTTP responder may be configured to receive this message or value and begin returning all of the subresources for the web page. These subresources may be similar to those that would be found in the metadata of the web page.

Subresource generator 340 may locate and/or provide subresources as requested, according to an embodiment. Subresources may be obtained by consulting a database of subresource information. It is possible that subresources are identified by a third party or obtained from the database. In some cases, subresources may be dynamically generated from one or more sources of content. Subresources may also be generated by parsing markup files, such as HTML or XML.

According to an embodiment, subresources may be returned by subresource returner 320 as an X-subresource header to the client as part of the HTTP response header block. An example header is shown below with the following format:

header-value::=type; resource [; type; resource]
type::=text
resource::=URI

Each resource consists of a type and a URI. The type is the mime-type of the URI, such as "text/html", "image/gif", etc. The URI is a standard HTTP URI. For example: X-subresource: text/css; http://www.foo.com/styles/foo.css; image/gif/images/img1.gif. Other header formats may be used.

There are instances when some filtering or selection of subresources may take place by a component of HTTP responder 310. A server might not use subresource headers which are not cacheable. In other cases, subresources whose lifetime might expire before the end of the current page load may be selected out or not provided.

Figure 4:
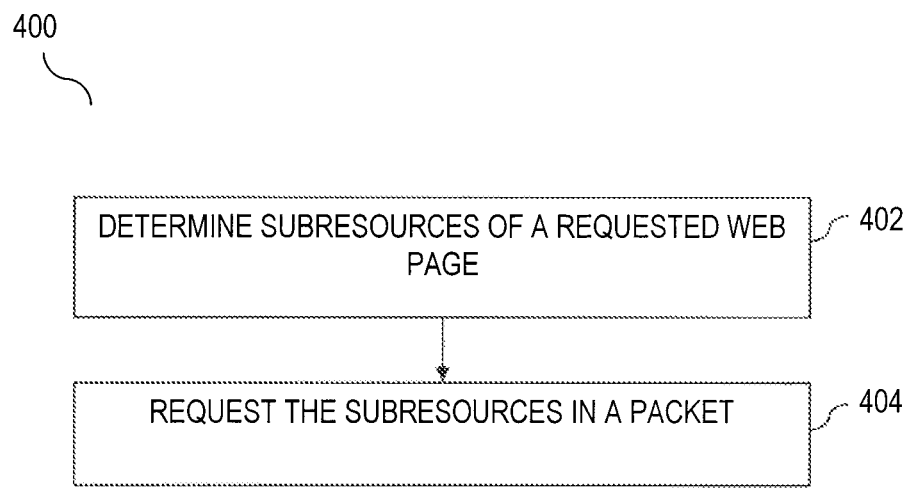
FIG. 4 is a flowchart illustrating a method for reducing web page load time according to an embodiment.
Figure 5:
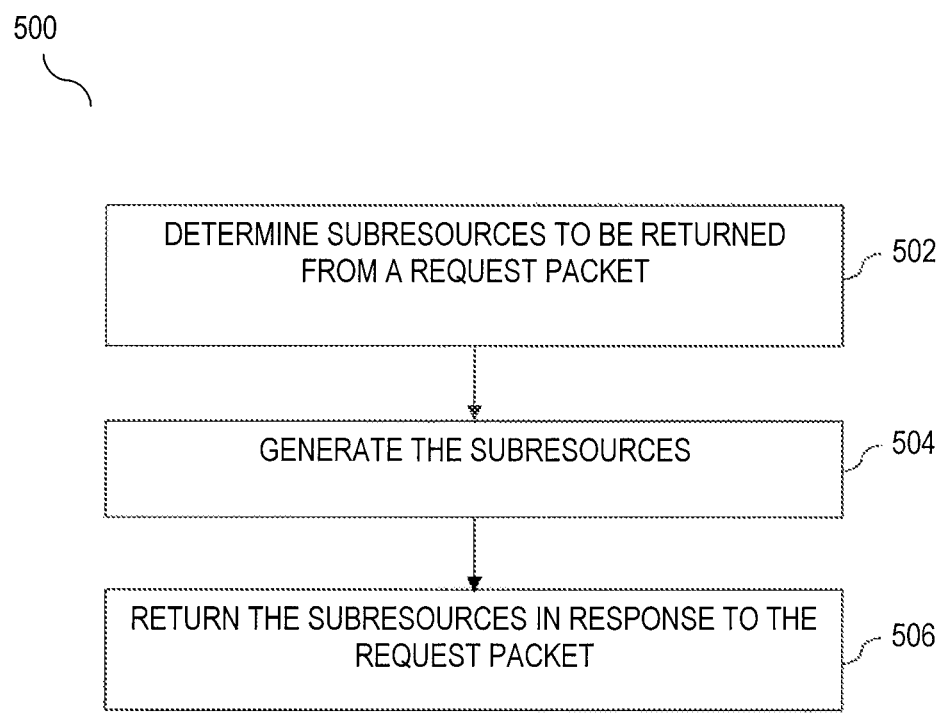
FIG. 5 is a flowchart illustrating another method for reducing web page load time according to an embodiment.

FIG. 4 is a flowchart of exemplary method 400 for reducing web page load time according to an embodiment. Subresource requests may be bundled or combined into a single request or packet. FIG. 5 is a flowchart of exemplary method 500 for reducing web page load time according to another embodiment. Subresources requested at once may be identified or generated and returned to the requester. While methods 400 and 500 are described with respect to an embodiment of the present invention, methods 400 and 500 are not meant to be limiting and may be used in other applications. In an example, methods 400 and 500 may be used to reduce web page or web content load time using systems 200 and 300 of FIG. 2 or 3. However, methods 400 and 500 are not meant to be limited to systems 200 or 300.

As shown in FIG. 4, exemplary method 400 begins at step 402 where subresources of a web page are determined. A user may navigate to a web page. Upon navigation, the subresources may be apparent. In an embodiment, subresources may be listed in the metadata of the web page. This provides for a quicker request of the subresources at once. In other cases, subresource names or information may need to be gathered or collected. Such information may be in the web page or may be obtained from another source pointed to by the web page. In some embodiments, subresource determiner 220 may be used to determine the subresources. This may involve parsing a subresource list in preparation for a request of the subresources.

At step 404, the multiple determined subresources may form a single request for the subresources. In most cases, a single packet may be used. In further embodiments, an HTTP request header may be loaded with the subresources to be requested. Subresource requester 230 may perform these steps and request the subresources. Steps 402-404 may be implemented as software, hardware, firmware, or any combination thereof.

In FIG. 5, exemplary method 500 begins at stage 502 where subresources that are requested and expected to be returned are determined. This may include parsing a header or content of the request packet. This may also involve identifying an enablement tag. Once the subresources are determined by subresource request determiner 330, they may be gathered or generated by subresource generator 340 at step 504.

At step 504, the subresources are generated. Subresources may be fetched from the server or other domain servers. Subresources may be generated based on the request information. Subresources may also be obtained from or by consulting a subresource database or other data repository or source, local or remote.

At step 506, the subresources may be returned by subresource returner 320. These may be returned in the content of one or more packets. The subresources may be returned in an order specified by the request packet. Steps 502-506 may be implemented as software, hardware, firmware, or any combination thereof.

Aspects of the present invention, for exemplary system 200, system 300, method 400 and/or method 500 or any part(s) or function(s) thereof may be implemented using hardware, software modules, firmware, tangible computer readable or computer usable storage media having instructions stored thereon, or a combination thereof and may be implemented in one or more computer systems or other processing systems.

The above embodiments have been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for reducing web page load time comprising:
    requesting a web page from a server in a first request;
    receiving a first response from the server, the first response comprising the web page;

determining a plurality of subresources of the requested web page based on the requested web page in the first response;

requesting, with a computing device, the plurality of subresources in a second request, at the beginning of loading of the requested web page;

wherein the subresources are expected to be returned according to a list in the second request, and wherein the second request indicates that the computing device is enabled to request the subresources at once from a HTTP responder configured to receive the second request and begin returning all of the subresources for the web page; and receiving the plurality of subresources associated with the requested web page in a second response from the server.

2. The method of claim 1, wherein the requesting the plurality of subresources includes requesting the plurality of subresources in a request packet.

3. The method of claim 1, further comprising:

receiving the plurality of subresources of the web page prior to making further requests for any of the plurality of subresources.

4. The method of claim 1, wherein the requesting the plurality of subresources includes loading requests for the plurality of subresources into an HTTP request header that is transmitted over a network.

5. The method of claim 1, wherein the plurality of subresources is returned according to an order listed in the second request.

6. A system for reducing web page load time of a web page requested by a computing device from a server comprising:

a processor;

a memory coupled to the processor;

a subresource determiner configured to, when executed by the processor:

request a web page from a server in a first request;

receive a first response from the server, the first response comprising the web page;

determine a plurality of subresources of the requested web page based on the requested web page in the first response; and a subresource requester configured to, when executed by the processor:

request the plurality subresources in a second request, at the beginning of loading of the requested web page;

wherein the subresources are expected to be returned according to a list in the second request, and wherein the second request indicates that the computing device is enabled to request the subresources at once from a HTTP responder configured to receive the second request and begin returning all of the subresources for the web page; and receive the plurality of subresources associated with the requested web page in a second response from the server.

7. The system of claim 6, wherein the subresource requester is further configured to, when executed by the processor, request the plurality of subresources in a request packet.

8. The system of claim 6, wherein the subresource requester is further configured to, when executed by the processor, receive the plurality of subresources of the web page prior to making further requests for any of the plurality of subresources.

9. The system of claim 6, wherein the subresource requester is further configured to, when executed by the processor, load the plurality of subresources into an HTTP request header that is transmitted over a network.

10. The system of claim 6, wherein the plurality of subresources is returned in an order listed in the second request.

* * * * *